US009956618B2

(12) United States Patent
Inoue

(10) Patent No.: US 9,956,618 B2
(45) Date of Patent: May 1, 2018

(54) CUTTING INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Yoshihiro Inoue, Omihachiman (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days. days.

(21) Appl. No.: 15/128,569

(22) PCT Filed: Mar. 24, 2015

(86) PCT No.: PCT/JP2015/058848
§ 371 (c)(1),
(2) Date: Sep. 23, 2016

(87) PCT Pub. No.: WO2015/146956
PCT Pub. Date: Oct. 1, 2015

(65) Prior Publication Data
US 2017/0106451 A1 Apr. 20, 2017

(30) Foreign Application Priority Data
Mar. 25, 2014 (JP) .................................. 2014-062307

(51) Int. Cl.
*B23B 27/00* (2006.01)
*B23B 27/04* (2006.01)
(52) U.S. Cl.
CPC ...... *B23B 27/045* (2013.01); *B23B 2200/202* (2013.01); *B23B 2220/12* (2013.01)
(58) Field of Classification Search
CPC ... B23B 27/045; B23B 27/04; B23B 27/1625; B23B 27/1607; B23B 27/1666;
(Continued)

(56) References Cited

U.S. PATENT DOCUMENTS 4,558,974 A * 12/1985 Pano ..................... B23B 27/045
407/110
5,035,545 A * 7/1991 Zinner .................... B23B 27/04
407/108
(Continued)

FOREIGN PATENT DOCUMENTS

CN 102762326 A 10/2012
JP 10-505012 A 5/1998
(Continued)

OTHER PUBLICATIONS

Chinese Office Action with English concise explanation, Chinese Patent Application No. 201580015383.2, dated Jun. 13, 2017, 11 pgs.
(Continued)

*Primary Examiner* — Will Fridie, Jr.
(74) *Attorney, Agent, or Firm* — Volpe and Koenig, P.C.

(57) ABSTRACT

A cutting insert of one aspect includes a main body section and a cutting section located in front of the main body section. The cutting section includes a front cutting edge disposed along a ridge line of the cutting section at an intersection between a top surface and a first side surface; and a lateral cutting edge disposed along the ridge line at an intersection between the top surface and a second side surface and inclined with ascending as getting away from the front cutting edge. The lateral cutting edge each includes a first region and a second region located to a rear of the first region; and an angle of inclination of the second region with respect to the bottom surface is larger than an angle of inclination of the first region with respect to the bottom surface.

5 Claims, 12 Drawing Sheets

(58) Field of Classification Search
CPC ............... B23B 27/22; B23B 2200/12; B23B 2200/202; B23B 2200/087
See application file for complete search history.

(56) References Cited

U.S. PATENT DOCUMENTS

| | | | | |
|---|---|---|---|---|
| 5,076,739 | A * | 12/1991 | Pano | B23B 27/045 407/114 |
| 5,150,992 | A * | 9/1992 | Friedmann | B23B 27/045 407/110 |
| 5,346,335 | A * | 9/1994 | Harpaz | B23B 27/045 407/11 |
| 5,423,639 | A | 6/1995 | Wiman | |
| 5,921,724 | A * | 7/1999 | Erickson | B23B 27/04 407/109 |
| 6,799,925 | B2 * | 10/2004 | Ejderklint | B23B 27/045 407/114 |
| 7,788,998 | B2 * | 9/2010 | Ethington | B23B 1/00 310/328 |
| 7,883,300 | B1 * | 2/2011 | Simpson, III | B23B 27/045 407/113 |
| 9,108,248 | B2 * | 8/2015 | Fujii | B23B 27/045 |
| 2012/0297941 | A1 * | 11/2012 | Inoue | B23B 27/045 82/1.11 |
| 2015/0056029 | A1 * | 2/2015 | Shimamoto | B23B 27/045 407/115 |
| 2015/0224581 | A1 * | 8/2015 | Tsuda | B23B 27/045 407/66 |
| 2016/0207115 | A1 * | 7/2016 | Ikenaga | B23B 27/045 |

FOREIGN PATENT DOCUMENTS

| | | |
|---|---|---|
| JP | 11-0509784 A | 8/1999 |
| JP | 2006-502874 A | 1/2006 |
| JP | 2009-12116 A | 1/2009 |

OTHER PUBLICATIONS

Japanese Office Action with English concise explanation, Japanese Patent Application No. 2016-510370, dated Jul. 18, 2017, 5 pgs.
International Search Report (Form PCT/ISA/210) dated Jun. 23, 2015 and issued for PCT/JP2015/058848.

* cited by examiner

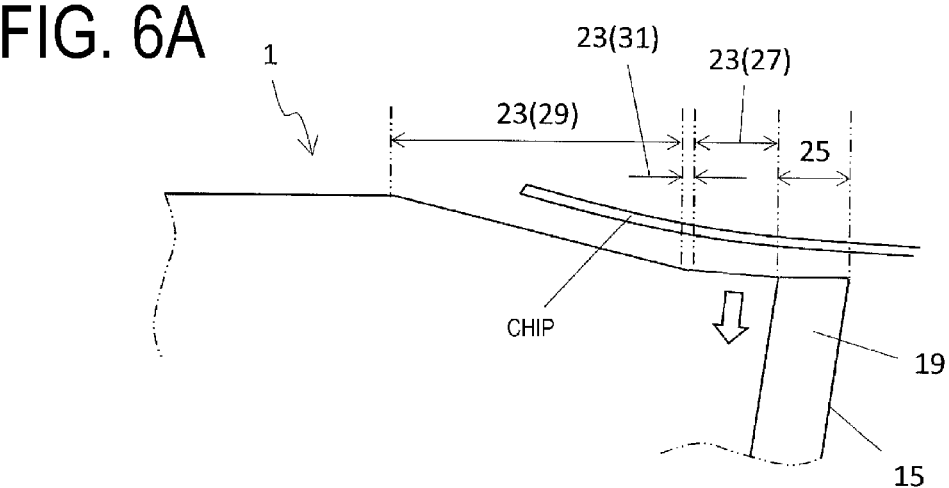
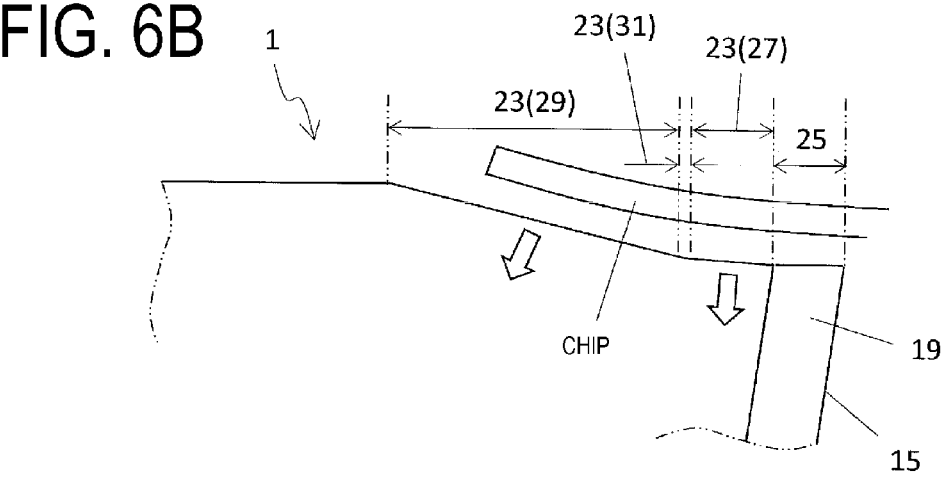

CUTTING INSERT, CUTTING TOOL, AND METHOD FOR MANUFACTURING MACHINED PRODUCT

TECHNICAL FIELD

The present embodiment relates to a cutting insert, a cutting tool, and a method for manufacturing a machined product.

BACKGROUND ART

Cutting inserts described in Japanese Unexamined Patent Application Publication No. H10-505012A (Patent Document 1), Japanese Unexamined Patent Application Publication (Translation of PCT Application) No. 2006-502874A (Patent Document 2), and Japanese Unexamined Patent Application Publication No. 2009-12116A (Patent Document 3) are known as cutting inserts for use in turning processing of a work material. For example, with the cutting insert described in Patent Document 3, a cutting edge portion is formed at an end portion of an insert body that elongates in a longitudinal direction. A front cutting edge and a lateral cutting edge are formed in the cutting edge portion. A top surface that functions as a rake surface is formed unevenly and, as such, the lateral cutting edge is also formed unevenly and matches the shape of the rake surface.

In order to avoid interference between a holder and the work material when attaching the cutting insert to the holder and performing grooving, a width, in a direction orthogonal to the longitudinal direction, at a portion where a bottom surface side of the cutting insert is held in the holder, is formed narrower than a width of the front cutting edge in this direction. Consequently, there are cases where the rigidity of the holder is insufficient and chatter vibration occurs.

In the cutting insert recited in Patent Document 3, a portion of the lateral cutting edge located at a front side is inclined with ascending as getting away from the front cutting edge. As a result of being inclined in this manner, a direction of cutting resistance applied to a region of the rake surface along this portion is not directed in a direction directly below, but rather is applied in a direction inclined toward the rear side. Accordingly, it is easier to stably hold the cutting insert in the holder.

As a result of the lateral cutting edge being inclined in the manner described above, it is easier to disperse forces applied to the cutting insert to the rear side. However, in cases where the lateral cutting edge is inclined greatly, while it is easier to disperse the forces to the rear side, forces applied from the lateral cutting edge on the chip so as to push back to the front side become greater. Consequently, in cases where a thickness of the chip is thin, there is a possibility of the chip being pushed back to the front side and chip jamming occurring.

In light of the problems described above, an object of the present invention is to provide a cutting insert that can be stably held in a holder and can stably process chips; a cutting tool; and a method for manufacturing a machined product.

SUMMARY OF INVENTION

A cutting insert according to an aspect includes a main body section elongated in a direction from a rear side to a front side, and a cutting section located in front of the main body section. The cutting section is provided with a top surface; a bottom surface; a first side surface located at the front side and between the top surface and the bottom surface; a second side surface located between the top surface and the bottom surface and adjacent to the first side surface; a front cutting edge disposed along a ridge line of the cutting section at an intersection between the top surface and the first side surface; and a lateral cutting edge disposed along the ridge line at an intersection between the top surface and the second side surface, the lateral cutting edge being inclined with ascending as getting away from the front cutting edge.

The lateral cutting edge is provided with a first region and a second region located to a rear of the first region. Additionally, the first region and the second region each has a linear shape in side view, and an angle of inclination of the second region with respect to the bottom surface is larger than an angle of inclination of the first region with respect to the bottom surface.

Advantageous Effects of Invention

In the cutting insert of the aspect described above, an entirety of the lateral cutting edge is inclined with ascending as getting away from the front cutting edge. Here, the lateral cutting edge is not flatly inclined, but rather has a configuration provided with the first region that has a relatively small angle of inclination and the second region that has a relatively large angle of inclination. The angle of inclination of the first region located at the front side of the lateral cutting edge is relatively small. As such, in cases where the machined grooves are shallow and a thickness of the chip is thin, and also in cases where the machined grooves are deep and the thickness of the chip is thick, the cutting insert can be stably held in the holder and chips can be stably processed.

BRIEF DESCRIPTION OF DRAWINGS

FIG. 6A is a conceptual diagram illustrating a state of a chip in a case where a work material is cut using only the first region of the lateral cutting edges. FIG. 6B is a conceptual diagram illustrating a state of a chip in a case where a work material is cut using both the first region and the second region of the lateral cutting edges.

DESCRIPTION OF EMBODIMENTS

Cutting Insert

Figure 1:
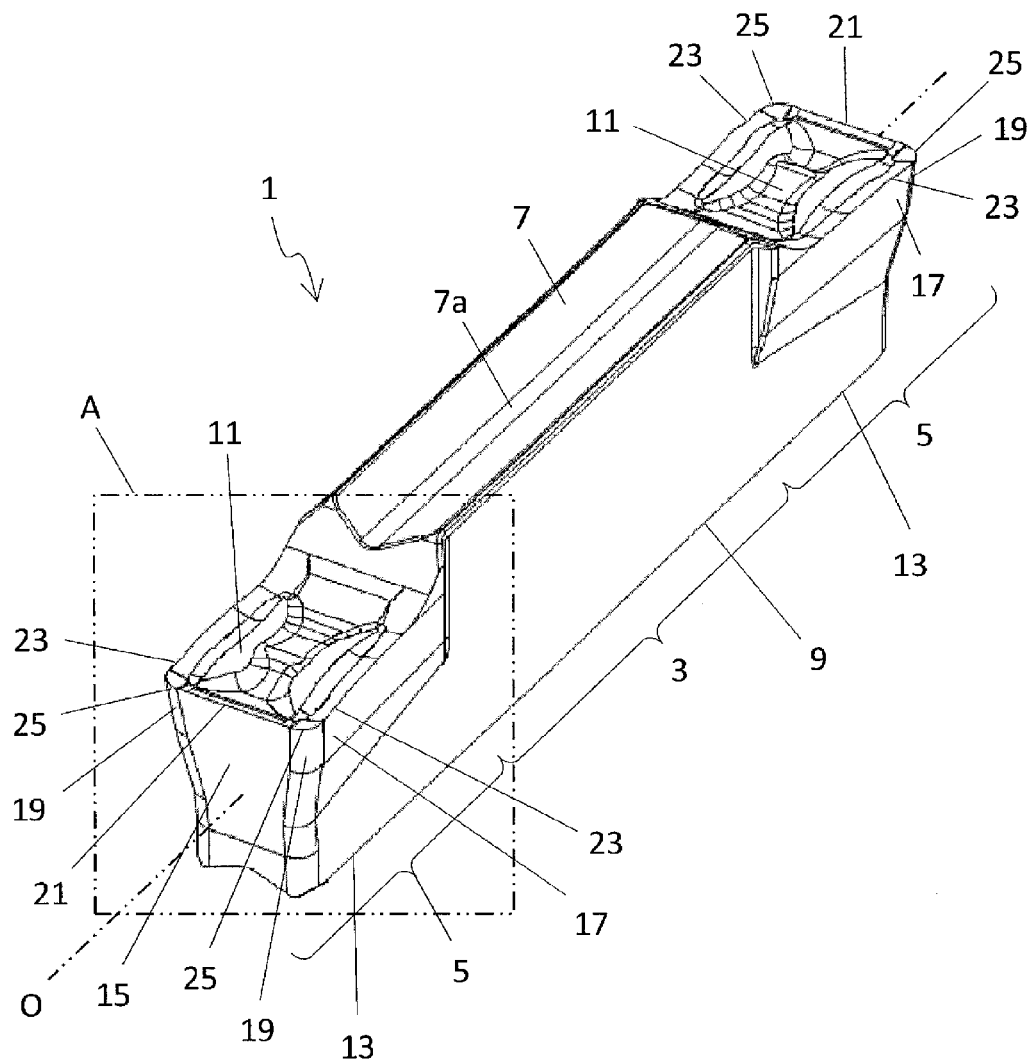
FIG. 1 is a perspective view illustrating a cutting insert of an embodiment.

A detailed description will be given below of a cutting insert of an embodiment (referred to below simply as "the insert") using the drawings. However, for convenience of explanation, each of the drawings referenced below is simplified to illustrate only the main members necessary to illustrate the present invention out of the constituent members of the embodiments. Accordingly, the cutting insert of the present invention may be provided with any constituent member which is not illustrated in each of the referenced drawings. Further, the dimensions of the members in the drawings do not faithfully represent the actual dimensions of the constituent members, the dimension ratios of the members, or the like.

As illustrated in FIGS. 1 to 6, an insert 1 of the present embodiment has one main body section 3 and two cutting sections 5. The main body section 3 has a rod shape that elongates from a rear side to a front side along a central axis O. The main body section 3 has a top side surface 7 located on a top side and that contacts a holder, and a bottom side surface 9 located on a bottom side and that contacts the holder.

A top side groove portion 7a that extends in a direction along the central axis O is formed in the top side surface 7. A bottom side groove portion that extends in the direction along the central axis O is formed in the same manner in the bottom side surface 9. The insert 1 can be stably secured in the holder due to the insert 1 being provided with the top side groove portion 7a and the bottom side groove portion and, as described later, also due to the holder being provided with a first protrusion that contacts the top side groove portion and a second protrusion that contacts the bottom side groove portion.

The size of the main body section 3 is not particularly limited but may, for example, be set so that a length along the central axis O is approximately from 5 to 80 mm. Additionally, when viewed from above, a width of a direction orthogonal to the central axis O may, for example, be set to approximately from 2 to 20 mm. Additionally, when viewed from the side, a width of a direction orthogonal to the central axis O may, for example, be set to approximately from 2 to 15 mm.

One of the cutting sections 5 may be located in front of the main body section 3. In the present embodiment, one of the cutting sections 5 is located in front of the main body section 3 and another of the cutting sections 5 is located in the rear of the main body section 3. The main body section 3 and the cutting section 5 may be formed separately or integrally. In the insert 1 of the present embodiment, the main body section 3 and the cutting section 5 are formed integrally.

Examples of the material of the member constituting the insert 1 include cemented carbide alloy, cermet, or the like. Examples of the composition of the cemented carbide alloy include, for example, WC—Co, WC—TiC—Co, and WC—TiC—TaC—Co. WC—Co is produced by adding a cobalt (Co) powder to tungsten carbide (WC), and sintering the mixture. WC—TiC—Co is formed by adding titanium carbide (TiC) to WC—Co. WC—TiC—TaC—Co is formed by adding tantalum carbide (TaC) to WC—TiC—Co.

Further, cermet is a sintered composite material obtained by combining a metal with a ceramic component. Specifically, examples of the cermet include compounds in which a titanium compound such as titanium carbide (TiC), or titanium nitride (TiN) is the main component.

The surface of the member described above constituting the insert 1 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina ($Al_2O_3$), and the like.

Figure 2:
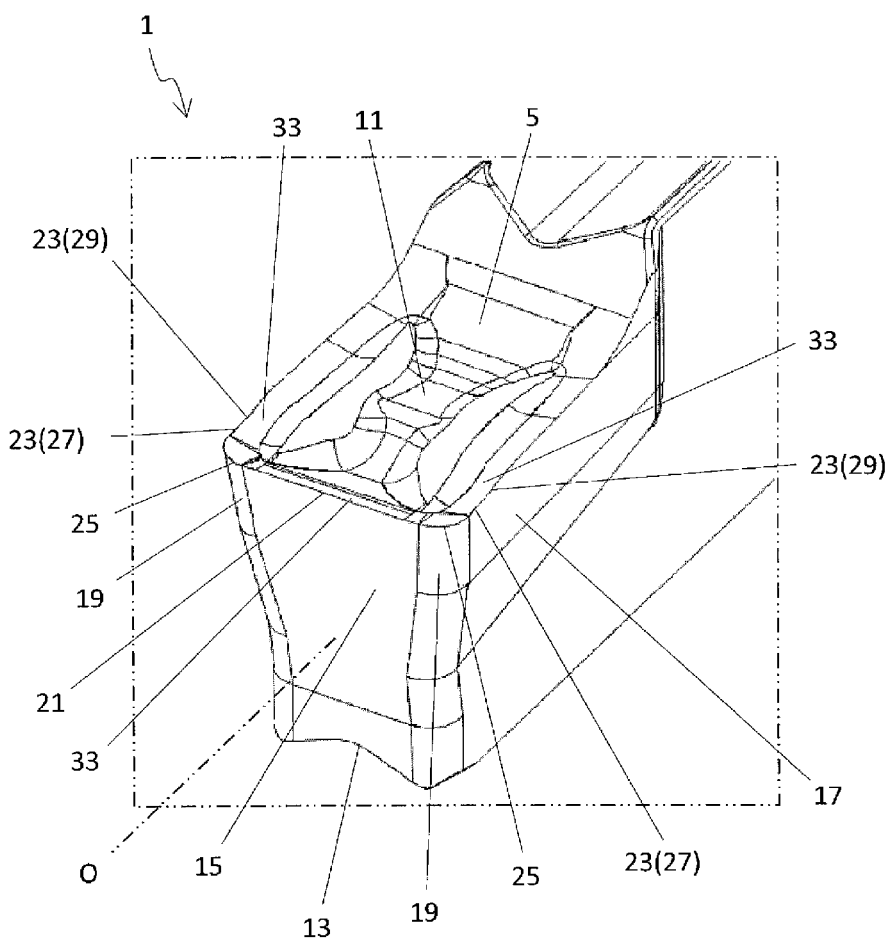
FIG. 2 is an enlarged perspective view of a region A of the cutting insert illustrated in FIG. 1.
Figure 3:
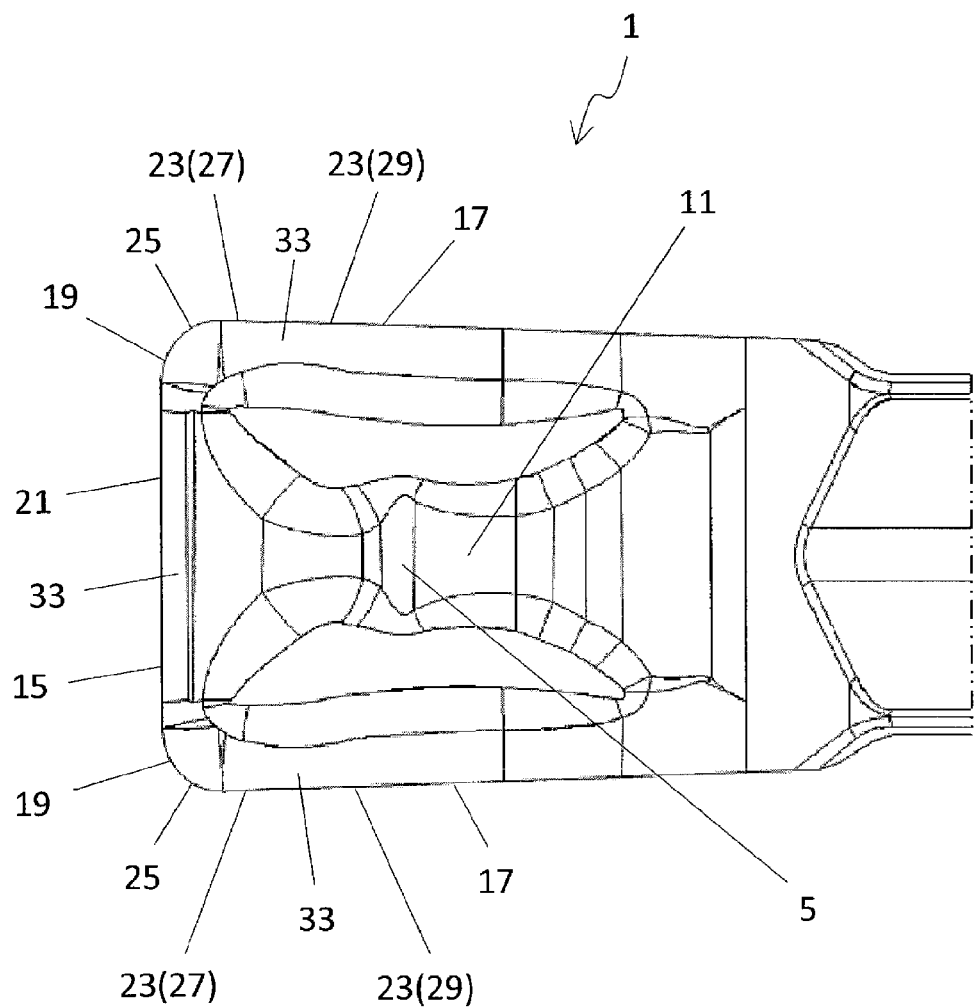
FIG. 3 is a top view of the cutting insert illustrated in FIG. 2.
Figure 4:
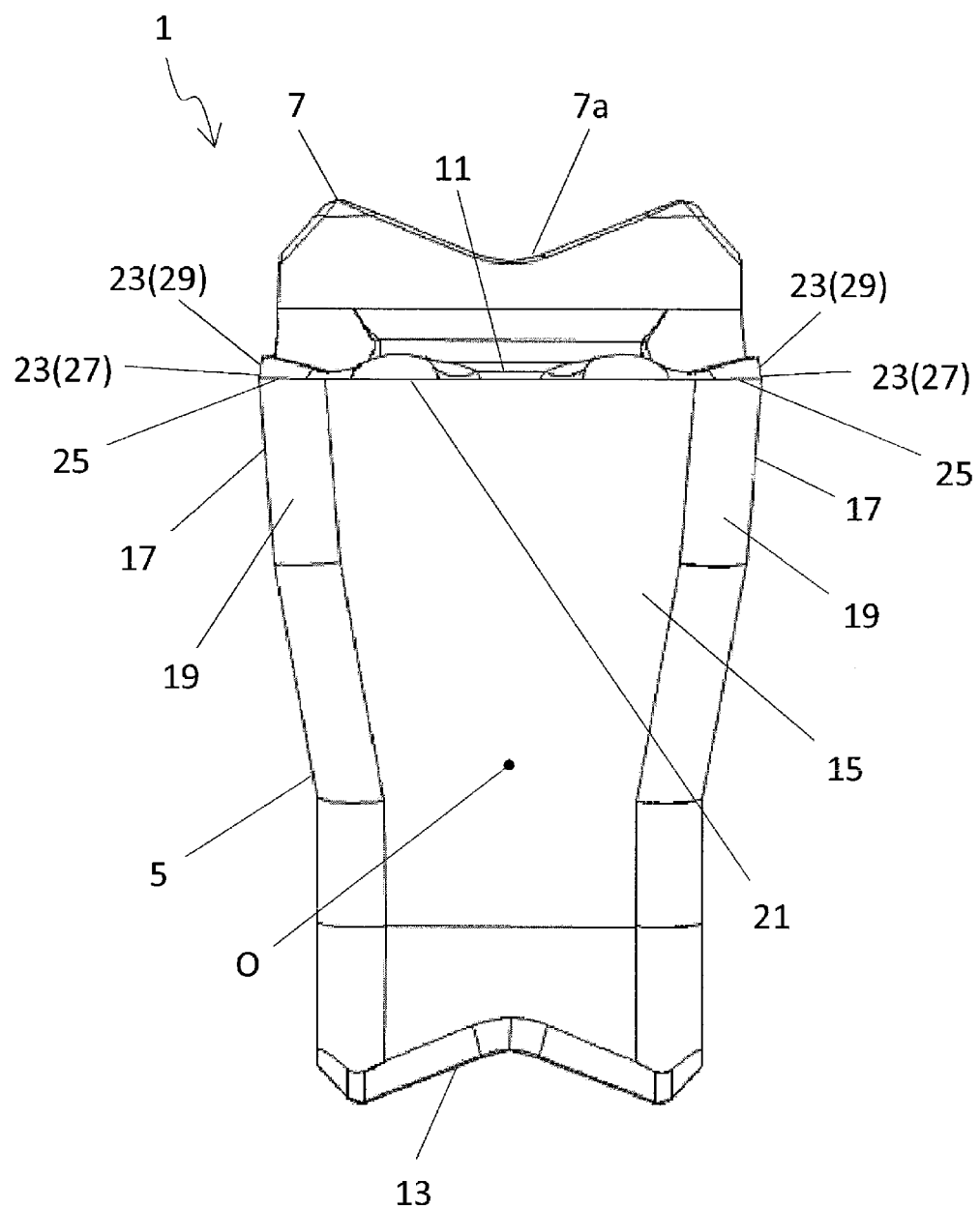
FIG. 4 is a side view from a front side of the cutting insert illustrated in FIG. 1.
Figure 5A:
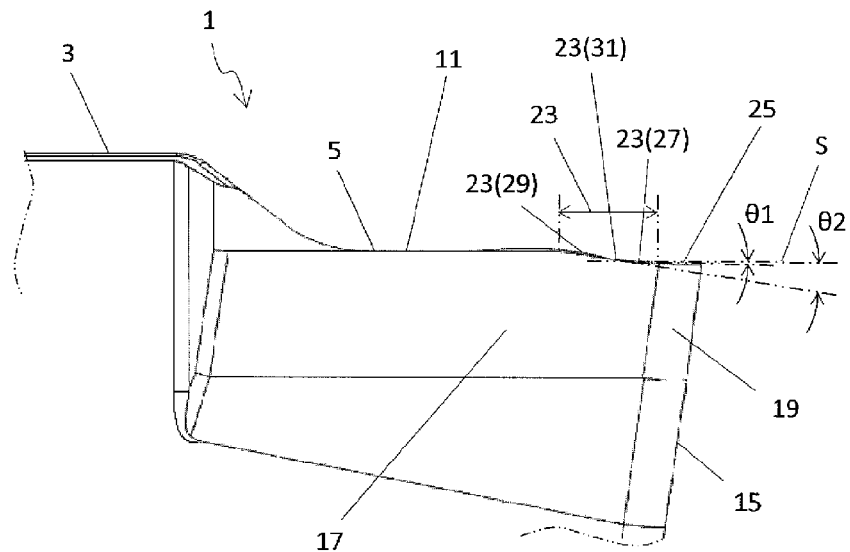
FIG. 5A is a side view from a side of a second side surface located on a top side of the cutting insert.
Figure 5B:
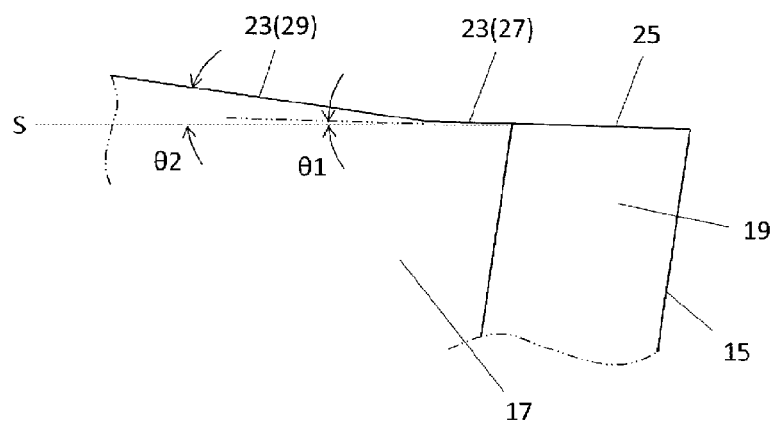
FIG. 5B is an enlarged view of the lateral cutting edge in FIG. 5A.

When performing machining using the insert 1 of the present embodiment, one of the two cutting sections 5 is used. In cases where the cutting section 5 located in the rear of the main body section 3 is used, the front side and the rear side of the main body section 3 are reversed and the insert 1 is attached to the holder. The cutting section 5 located in front of the main body section 3 and the cutting section 5 located in the rear of the main body section 3 have the same shape. As such, in the following, a case where the cutting section 5 in front of the main body section 3 will be described. The cutting section 5 located in front of the main body section 3 is illustrated in FIG. 2.

The cutting section 5 is provided with a top surface 11, a bottom surface 13, a first side surface (front side surface) 15, second side surfaces (lateral side surfaces) 17, third side surfaces (corner side surfaces) 19, a front cutting edge 21, lateral cutting edges 23, and corner cutting edges 25. The top surface 11 and the bottom surface 13 each extend from the rear side to the front side. When viewed from above, the shape of the top surface 11 is roughly rectangular. Of the outer periphery of the top surface 11, the cutting section 5 is contiguous with the main body section 3 at the short edge located on the rear side. When viewed from below, the shape of the bottom surface 13 is roughly rectangular, similar to the top surface 11.

Of the side surfaces located between the top surface 11 and the bottom surface 13, the first side surface 15 is a flat portion located at the front side. When viewed from the side from the first side surface, the first side surface 15 has a substantially quadrangular shape. A pair of flat second side surfaces 17 is located at a portion of the side surfaces adjacent to the first side surface 15. The pair of second side surfaces 17 each extends from the rear side to the front side.

The first side surface 15 and the second side surfaces 17 are substantially orthogonal to each other, and third side surfaces 19 are located between the first side surface 15 and the second side surfaces 17. The first side surface 15 and the second side surfaces 17 are substantially flat surfaces, and the third side surfaces 19 have a curved shape in order to smoothly connect the first side surface 15 and the second side surfaces 17. Note that the third side surfaces 19 are optional.

In the insert 1 of the present embodiment, the central axis O is located passing through the center of the first side surface 15 of each of the two cutting sections 5. When viewed from the side from the first side surface, the first side surface 15 is a substantially quadrangular. A location corresponding to the center of the maximum width and the center of the maximum height of the first side surface 15 is considered to be the center of the first side surface 15.

The first side surface 15, the second side surfaces 17, and the third side surfaces 19 each function as relief faces when machining the work material. As such, when viewed from the side, the first side surface 15, the second side surfaces 17, and the third side surfaces 19 each are directed inside the cutting section 5, from the side of the top surface 11 toward the side of the bottom surface 13. Additionally, as the side surfaces are configured as described above, the bottom surface 13 is slightly small in size compared to the top surface 11.

A size of the cutting section 5 is not particularly limited but, for example, is set so that a length along the central axis O is approximately from 3 to 8 mm.

A front cutting edge 21 is disposed along a ridge line at an intersection between the top surface 11 and the first side surface 15. Lateral cutting edges 23 are disposed along ridge lines at intersections between the top surface 11 and the second side surfaces 17. Corner cutting edges 25 are disposed along ridge lines at intersections between the top surface 11 and the third side surfaces 19. When performing machining using the insert 1 of the present embodiment, the work material is cut by the front cutting edge 21, the lateral cutting edges 23, and the corner cutting edges 25. Note that the corner cutting edges 25 are optional.

The ridge lines where each of the first side surface 15, the second side surfaces 17, and the third side surfaces 19 intersect the top surface 11 do not have a strict linear shape by the intersection of the two surfaces. When the portions at the ridge lines where the side surfaces intersect with the top surface 11 are sharp with the acute angles, the durability of the cutting edge degrades. As such, the portions where the top surface 11 and the side surfaces described above intersect are subjected to a so-called honing process, and these portions are provided with a slightly curved shape.

The front cutting edge 21 of the present embodiment extends in a direction parallel to the bottom surface 13 and orthogonal to the central axis O. As such, the front cutting edge 21 is located on an imaginary plane parallel to the bottom surface 13. The corner cutting edges 25 are located at the same height as the front cutting edge 21. As such, the corner cutting edges 25 are also located on the imaginary plane described above.

On the other hand, the lateral cutting edges 23 are inclined with ascending as getting away from the front cutting edge 21. In other words, the lateral cutting edges 23 are inclined with ascending from the front side to the rear side.

Note that "the lateral cutting edges 23 are inclined with ascending" means that the lateral cutting edges 23 are not inclined with descending as getting away from the front cutting edge 21. As such, the lateral cutting edges 23 may have a portion that is partially parallel to the bottom surface 13.

Typically, a width, at the portion located below the insert 1 when the insert 1 is attached to the holder, of the direction parallel to the bottom surface 13 of the cutting section 5 and orthogonal to the central axis O is set narrower than the width of the front cutting edge 21 described above. This configuration is to avoid interference between the holder and the work material.

Additionally, in cases where a work material is machined using an insert 1 such as that of the present embodiment, of the cutting resistance applied to the cutting insert 1, fundamentally, a component of force from the cutting edge toward the side of the bottom surface 13 is greater than a component of force from the cutting edge toward the rear side. As a result, the cutting resistance is received by an insert pocket (hereinafter, also referred to simply as the "pocket") of the holder that is set to be narrower than the width of the top surface 11 of the insert 1. Consequently, when the resistance is large, the rigidity of the holder may be insufficient and chatter vibration may occur.

However, in the insert 1 of the present embodiment, as described above, the lateral cutting edges 23 are inclined with ascending. As such, of the cutting resistance applied to the insert 1, a ratio of the component of force from the cutting edge toward the rear side becomes greater than the component of force from the cutting edge toward the side of the bottom surface 13. Accordingly, the insert 1 can be supported across a wide range of the holder and, thus, the occurrence of chatter vibration can be decreased.

Furthermore, in the insert 1 of the present embodiment, the lateral cutting edges 23 have the following configuration and, thus, the occurrence of chatter vibration can be more reliably decreased. Specifically, the lateral cutting edges 23 of the present embodiment are each provided with a first region 27 and a second region 29. The first regions 27 are connected to the corner cutting edges 25. Additionally, the second regions 29 are located to a rear of the first regions 27. Note that it is not necessary that the second region 29 and the first region 27 be contiguous.

When viewed from the side, each of the first regions 27 and the second regions 29 has a linear shape, and an angle of inclination $\theta 2$ of the second regions 29 with respect to the bottom surface 13 is larger than an angle of inclination $\theta 1$ of the first regions 27 with respect to the bottom surface 13.

When viewed from the side, the lateral cutting edges 23 are inclined and, thus, the cutting resistance can be caused to act more toward the direction inclined to the rear side. However, in cases where the lateral cutting edges 23 are flatly inclined and the angle of inclination thereof is small, when the cutting resistance applied to the insert 1 is large, this cutting resistance cannot be sufficiently dispersed in the direction from the cutting edge toward the rear side. Additionally, in cases where the angle of inclination described above is large, when the thickness of the chip is thin, the chip may be pushed back to the front side and chip jamming may occur.

Specifically, in cases where the feed rate is low or where the depth of the machined grooves is shallow such as at an initial stage of machining, the second regions 29 of the lateral cutting edges 23 will not contact the chip, and only the first regions 27 of the lateral cutting edges 23 will contact the chip. However, in these cases, as illustrated in FIG. 6A, the cutting resistance is small and the thickness of the chip is thin. Note that in FIG. 6A, the cutting resistance applied to the lateral cutting edges 23 is illustrated by the arrow.

In the insert 1 of the present embodiment, the angle of inclination $\theta 1$ of the first regions 27 of the lateral cutting edges 23 is relatively small. As such, as illustrated in FIG. 6A, in cases where the thickness of the chip is thin, the possibility of chatter vibration occurring can be decreased and the chips can be discharged well.

Additionally, in cases where the angle of inclination of the first regions 27 is large, when only the first regions 27 of the lateral cutting edges 23 contact the chip, the chip is forcefully pressed back to the front side and, as a result, the cutting resistance applied to the first regions 27 increases. Consequently, there is a possibility that chatter vibration will more easily occur. However, in the insert 1 of the present embodiment, the angle of inclination $\theta 1$ is relatively small and, thus, the cutting resistance applied to the first regions 27 decreases. As such, the occurrence of chatter vibration can be decreased.

Additionally, in cases where the feed rate is high or where the depth of the machined grooves is deep in the machining, both the first regions 27 and the second regions 29 of the lateral cutting edges 23 contact the chip. However, in these cases, as illustrated in FIG. 6B, the cutting resistance is large and the thickness of the chip is thick. Note that in FIG. 6B, the cutting resistance applied to the lateral cutting edges 23 is illustrated by the arrows.

In the insert 1 of the present embodiment, the angle of inclination θ2 of the second regions 29 of the lateral cutting edges 23 is relatively large. As such, as illustrated in FIG. 6B, in cases where the thickness of the chip is thick, the load can be dispersed in the direction from the cutting edge toward the rear side. Therefore, the forces applied to the holder from the insert 1 are more easily dispersed across a wide range of the holder.

Thus, in either of the cases where only the first regions 27 of the lateral cutting edges 23 contact the chip, and the cases where both of the first regions 27 and the second regions 29 of the lateral cutting edges 23 contact the chip, the insert 1 can be stably held in the holder and chips can be stably processed.

Note that the angles of inclination θ1 and θ2 of the first regions 27 and the second regions 29 with respect to the bottom surface 13 may be evaluated by, in a side view, providing imaginary extended lines from the first regions 27 and the second regions 29 and using angles where these extended lines intersect the bottom surface 13. Additionally, the angles of inclination described above may be evaluated by providing an imaginary plane S parallel to the bottom surface 13 and using angles where this imaginary plane S intersects the first regions 27 and the second regions 29.

Specific values of the angles of inclination θ1 and θ2 can be appropriately set depending on the material of the work material used in the machining and the feed rate of the insert 1 in the machining. For example, the angle of inclination θ1 may be set to 1 to 10°. The angle of inclination θ2 may be set to 5 to 20°.

In cases where the bottom surface 13 has a flat planar shape, the angles of inclination can easily be evaluated by the method described above. On the other hand, in cases where the bottom surface 13 is not flat, when viewed from the side, an imaginary plane S that passes through the lower end of the bottom surface 13 and is parallel to the central axis O may be used as a reference, and angles with respect to this imaginary plane S may be evaluated as the angles of inclination.

The first regions 27 and the second regions 29 of the lateral cutting edges 23 of the present embodiment are not contiguous. Connecting regions 31 that have a curved shape are located between the first regions 27 and the second regions 29. Similar to the first regions 27 and the second regions 29, the connecting regions 31 that have a curved shape are also inclined with ascending as getting away from the front cutting edge 21. The first regions 27 and the second regions 29 are smoothly connected via these connecting regions 31.

The angle of inclination θ2 of the second regions 29 is larger than the angle of inclination θ1 of the first regions 27 and, as such, in cases where the first regions 27 are directly connected to the second regions 29, there may be a possibility that the load will be concentrated at the boundaries between the first regions 27 and the second regions 29. Additionally, advancing directions of the chip differ between the first regions 27 and the second regions 29 and, as such, there may be a possibility that the chip will jam at the boundaries between the first regions 27 and the second regions 29. However, in cases where the lateral cutting edges 23 have the connecting regions 31 described above, each of the possibility of the load becoming concentrated and the possibility of the chip jamming can be reduced.

The top surface 11 of the cutting section 5 in the present embodiment has a rake face 33. The rake face 33 is formed along the front cutting edge 21, the lateral cutting edges 23, and the corner cutting edges 25. The rake face 33 has a role of raking the chips that are cut by these cutting edges. Thus, the chips of the work material flow over a surface of the rake face 33. To ensure smooth chip flow, the rake face 33 is inclined with descending as getting away from the front cutting edge 21, the lateral cutting edges 23, and the corner cutting edges 25, that is, in other words, the rake face 33 is inclined such that a height thereof from the bottom surface 13 decreases.

Note that the top surface 11 in the present embodiment has a configuration in which the rake face 33 directly contacts the cutting edges, but the configuration is not limited thereto. For example, in order to increase the strength of the front cutting edge 21, the lateral cutting edges 23, and the corner cutting edges 25, a land surface (not illustrated) may be further disposed in a region that is outside the rake face 33 and along the front cutting edge 21, the lateral cutting edges 23, and the corner cutting edges 25. Additionally, protrusions (not illustrated) may be further disposed on the top surface 11 in order to control the flow of the chips.

Modified Example 1

Figure 7A:
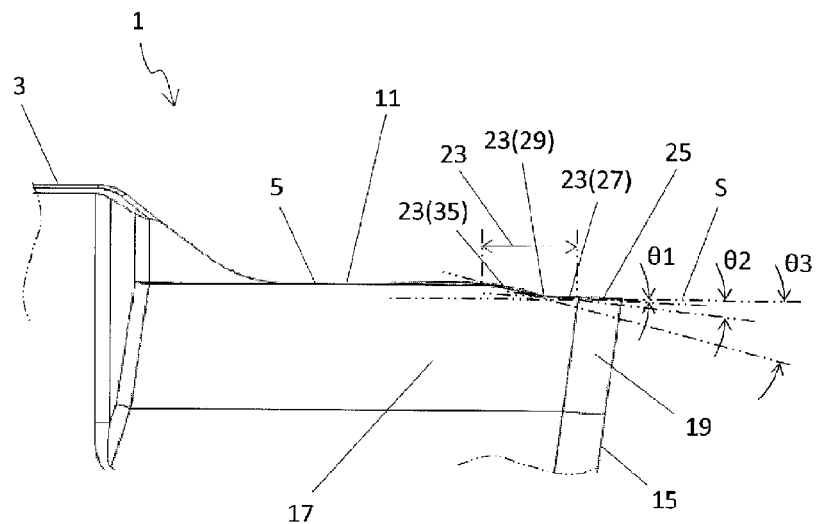
FIG. 7A is a side view illustrating a Modified Example 1 of the cutting insert illustrated in FIGS. 5A and 5B.
Figure 7B:
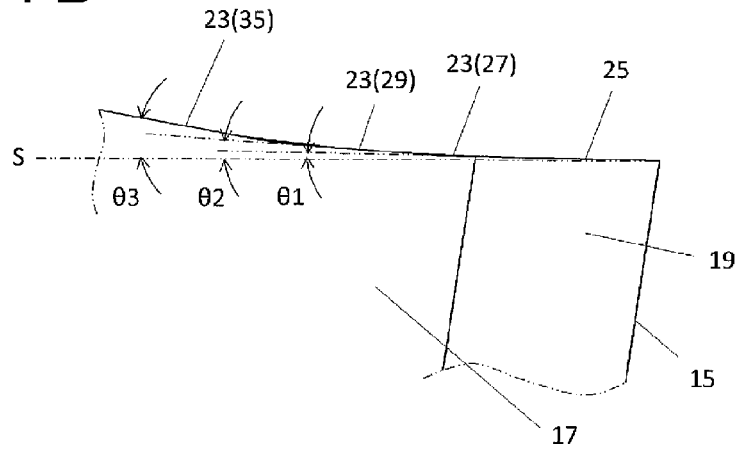
FIG. 7B is an enlarged view of the lateral cutting edge in FIG. 7A.

In the insert 1 of the embodiment described above, the lateral cutting edges 23 have the first regions 27 and the second regions 29. However, as illustrated in FIGS. 7A and 7B, the lateral cutting edges 23 may also have third regions 35 that have a linear shape and located to a rear of the second regions 29. An angle of inclination θ3 of the third regions 35 with respect to the imaginary plane S is larger than the angle of inclination θ2 of the second regions 29. In cases where these third regions 35 are provided, stepwise changes in the angles of inclination of the lateral cutting edges 23 can be made more minutely. As such, the occurrence of chatter vibration can be more reliably decreased.

Note that aside from the lateral cutting edges 23 having the third regions 35, the insert 1 of the present modified example has the same configuration as the insert 1 of the embodiment described above.

Modified Example 2

Figure 8A:
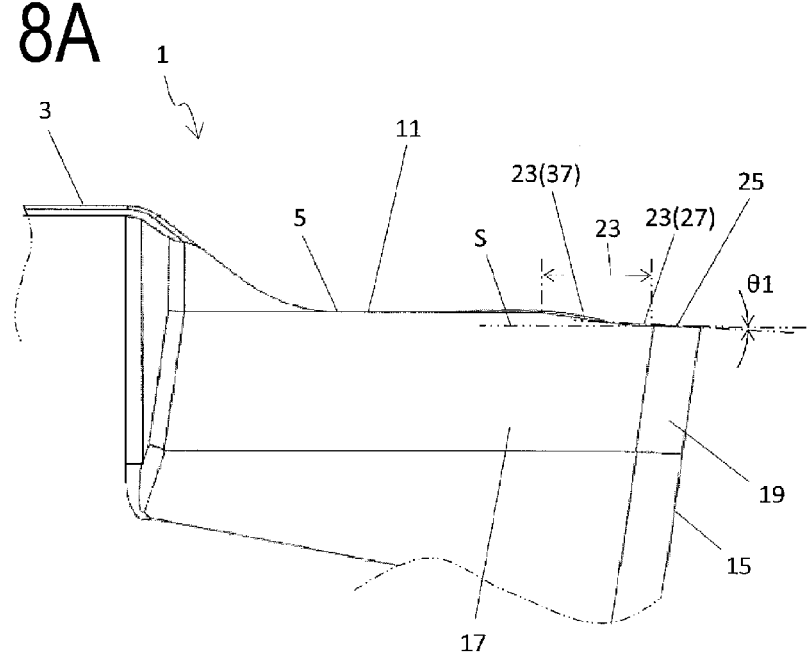
FIG. 8A is a side view illustrating a Modified Example 2 of the cutting insert illustrated in FIGS. 5A and 5B.
Figure 8B:
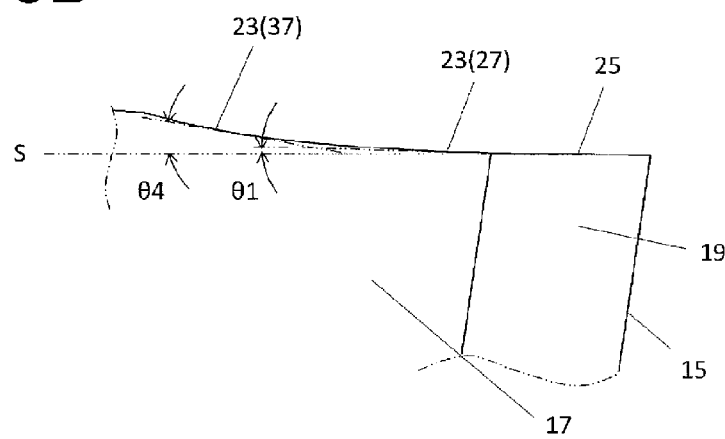
FIG. 8B is an enlarged view of the lateral cutting edge in FIG. 8A.

In the insert 1 of the embodiment described above, the lateral cutting edges 23 have the first regions 27 and the second regions 29. However, as illustrated in FIGS. 8A and 8B, instead of the second regions 29, the insert 1 of the present modified example has fourth regions 37 that have a curved shape and that are inclined with ascending as getting away from the front cutting edge 21. When viewed from the side, the fourth regions 37 that have a curved shape connect smoothly with the first regions 27. As such, an angle of inclination θ4 of the fourth regions 37 is equivalent to the angle of inclination θ1 of the first regions 27 at an end portion located on the front side. Additionally, the angle of inclination θ4 of the fourth regions 37 becomes larger from this end portion toward the rear side. The angle of inclination θ4 of the fourth regions 37 that have a curved shape can be evaluated by setting a tangent line that contacts the fourth regions 37 in a side view, and using the angle formed between this tangent line and the imaginary plane S.

In this case, the first regions 27 that have a linear shape and the fourth regions 37 that have a curved shape are provided. Even in this case, the forces applied from the cutting insert 1 to the holder can be dispersed across a wide range of the holder and good machining can be performed. Particularly, due to the angle of inclination of the fourth regions 37 becoming larger from the front side toward the rear side as described above, the insert 1 of the present modified example can be advantageously used in cases of performing deeper grooving.

Note that aside from the lateral cutting edges 23 having the fourth regions 37 instead of the second regions 29, the insert 1 of the present modified example has the same configuration as the insert 1 of the embodiment described above.

Cutting Tool

Next, description will be given of a cutting tool 101 of an embodiment of the present invention using the drawings.

Figure 9:
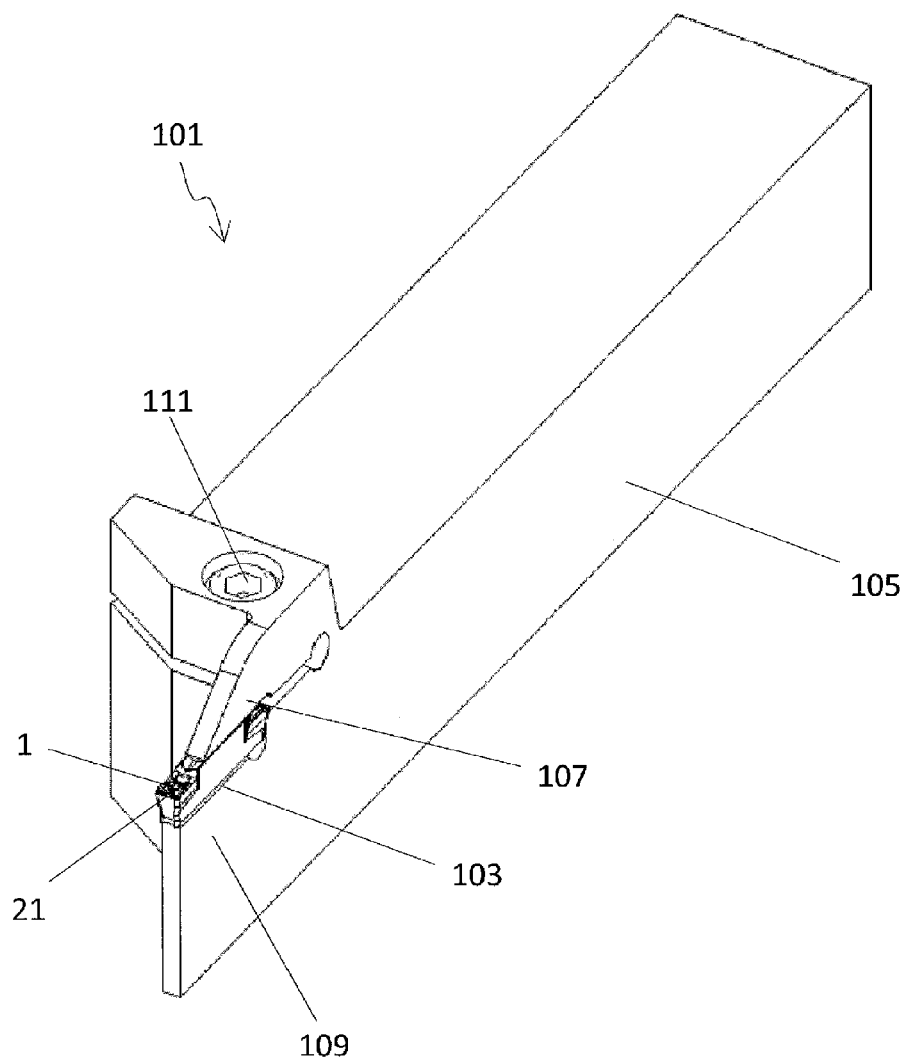
FIG. 9 is a perspective view illustrating a cutting tool of an embodiment.
Figure 10:
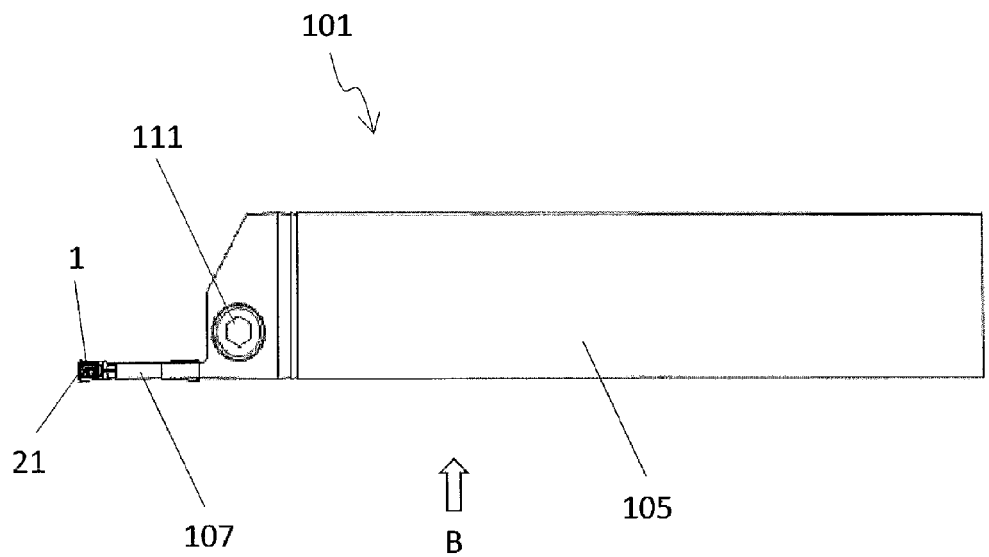
FIG. 10 is a top view of the cutting tool illustrated in FIG. 9.
Figure 11:
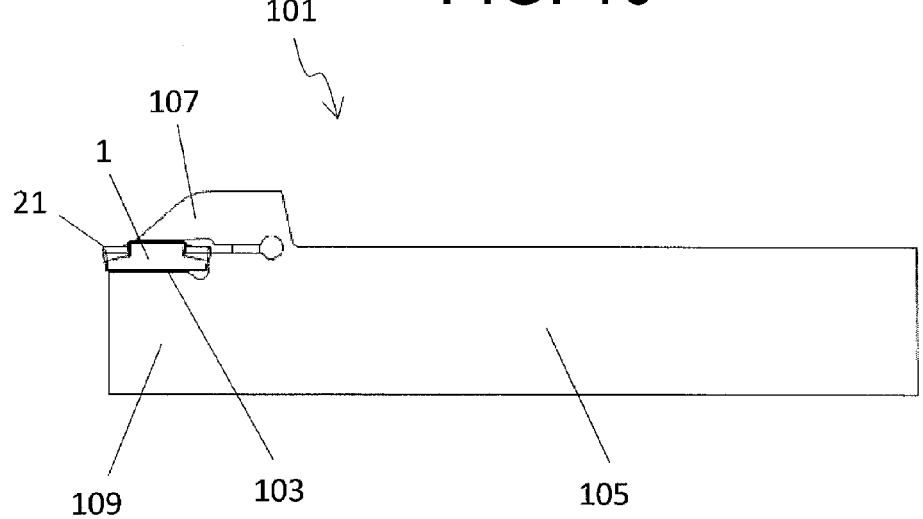
FIG. 11 is a side view from a direction of an arrow B illustrated in FIG. 10.

The cutting tool 101 of the present embodiment is provided with a holder 105 and the cutting insert 1 described above. The holder 105 includes a pocket 103 on a front end side. The cutting insert 1 is configured to be mounted to the pocket 103 with at least the front cutting edge 21 protruding from the front end of the holder 105, as illustrated in FIGS. 9 to 11.

The holder 105 of the present embodiment has a slender, elongated plate shape. A direction in which the holder 105 is slenderly elongated matches the direction in which the central axis O of the insert 1 extends. The front end of the holder 105 is provided with one pocket 103. The pocket 103 is a portion on which the insert 1 is mounted, and is opened to a front end surface of the holder 105.

The holder 105 has an upper jaw portion 107 that constrains the top side surface of the main body section of the insert 1, and a lower jaw portion 109 that constrains the bottom side surface of the main body section of the insert 1. The pocket 103 is formed from the region that the upper jaw portion 107 and the lower jaw portion 109 face. The main body section of the insert 1 is inserted and secured in the pocket 103, that is, the region between the upper jaw portion 107 and the lower jaw portion 109. When inserted and secured, the top side surface of the main body section contacts the upper jaw portion 107 of the holder 105; also, the bottom side surface of the main body section contacts the lower jaw portion 109 of the holder 105.

The top side surface of the main body section has the top side groove portion. As such, a first protrusion that contacts the top side groove portion is disposed in a region of the upper jaw portion 107 that faces the lower jaw portion 109. Additionally, the bottom side surface of the main body section has the bottom side groove portion. As such, a second protrusion that contacts the bottom side groove portion is disposed in a region of the lower jaw portion 109 that faces the upper jaw portion 107. These protrusions engage with the top side groove portion and the bottom side groove portion of the insert 1 and, thereby, can securely fix the insert 1 to the holder 105.

In the present embodiment, the holder 105 has a first screw hole (not illustrated) formed in the upper jaw portion 107 and a second screw hole (not illustrated) formed in the lower jaw portion 109 beneath the first screw hole. A fixing screw 111 is inserted in these screw holes and, thereby, the insert 1 is secured to the holder 105. Specifically, the fixing screw 111 is inserted into the first screw hole formed in the upper jaw portion 107 and the tip of the fixing screw 111 is then inserted into the second screw hole formed in the lower jaw portion 109. Thus, the fixing screw 111 is screwed into the first screw hole and the second screw hole.

For the holder 105, it is possible to use steel, cast iron, or the like. In particular, it may be preferable to use steel with a high toughness in these members.

Method for Manufacturing a Machined Product

Next, description will be given of a method for manufacturing a machined product of one embodiment of the present invention using the drawings.

The machined product is manufactured by machining a work material 201. In the present embodiment, boring is given as an example of the machining. The method for manufacturing a machined product of the present embodiment includes the following steps. Specifically the steps of:

(1) rotating a work material 201;

(2) bringing at least the front cutting edge 21 of the cutting tool 101, exemplified by the embodiment described above, into contact with the work material 201 that is rotating; and (3) separating the cutting tool 101 from the work material 201;

are provided.

Figure 12:
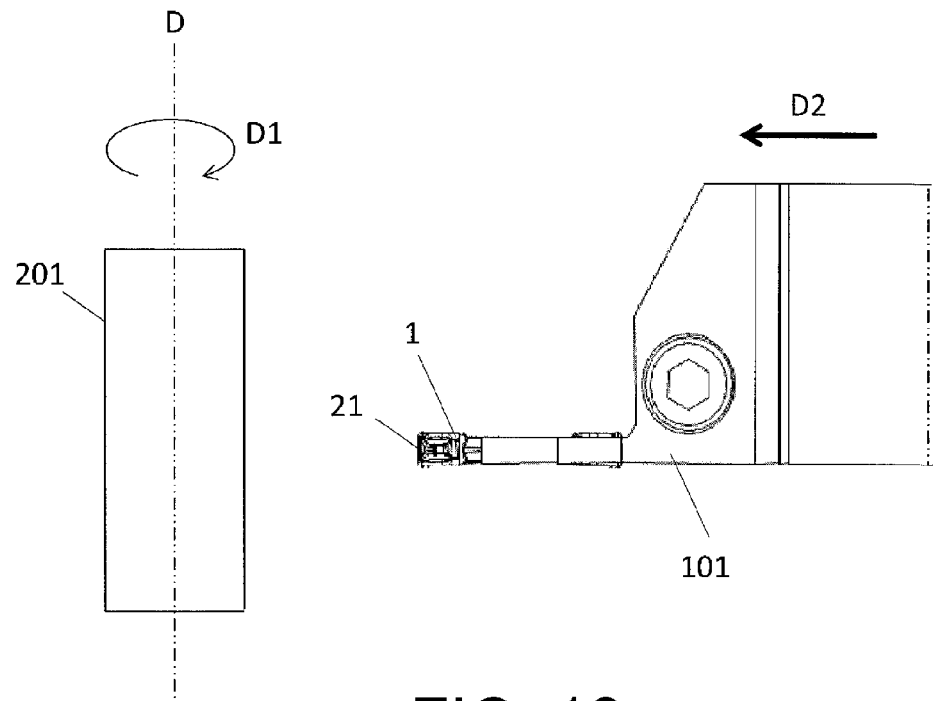
FIG. 12 is a drawing illustrating one step of a method for manufacturing a machined product of an embodiment.
Figure 13:
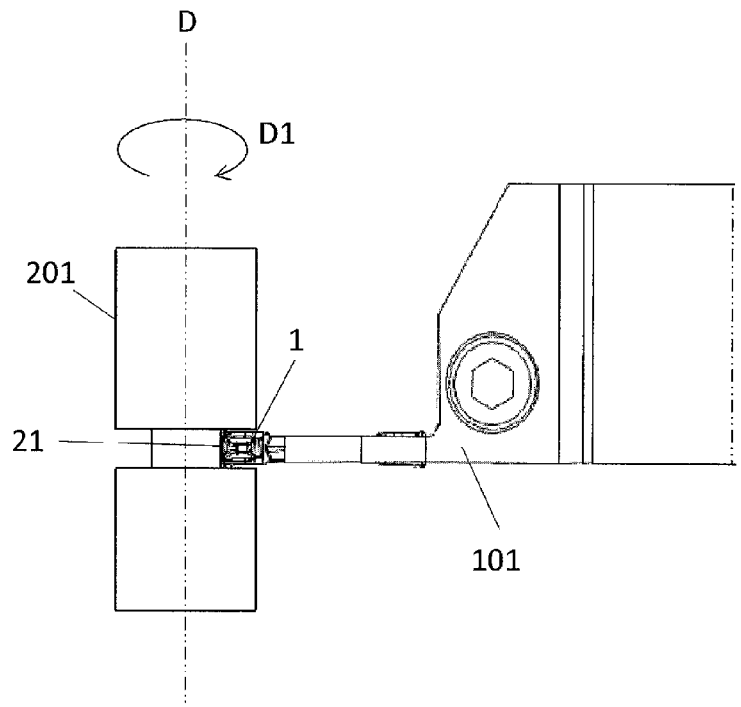
FIG. 13 is a drawing illustrating one step of a method for manufacturing a machined product of an embodiment.
Figure 14:
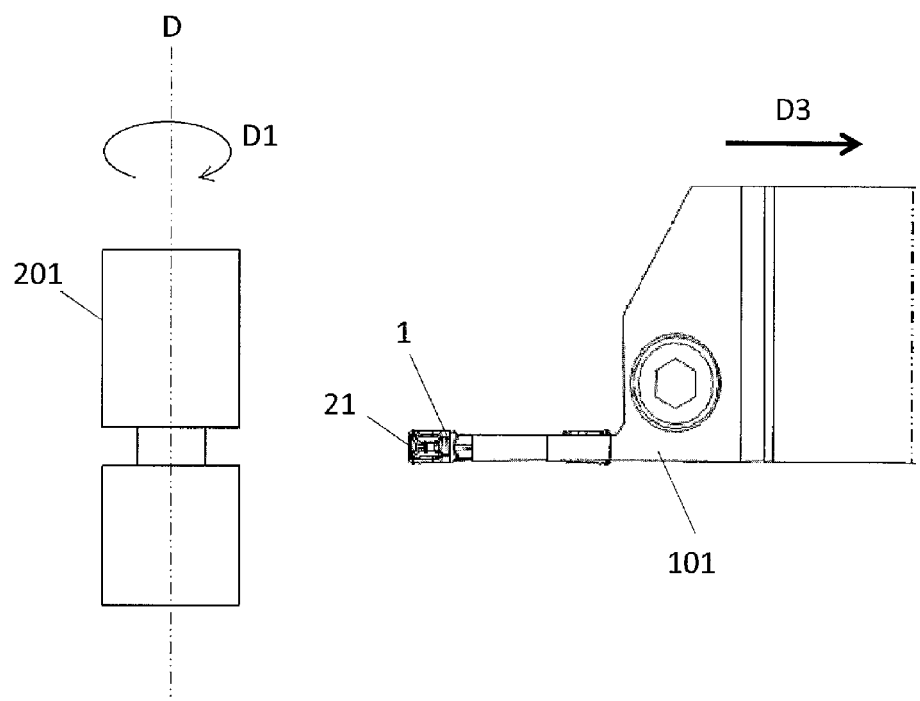
FIG. 14 is a drawing illustrating one step of a method for manufacturing a machined product of an embodiment.

More specifically, first, as illustrated in FIG. 12, the work material 201 is rotated in a D1 direction about an axis D. The cutting tool 101 is brought relatively close to the work material 201 by moving the cutting tool 101 in a D2 direction. Next, as illustrated in FIG. 13, the front cutting edge 21, the corner cutting edges, and the lateral cutting edges of the cutting tool 101 are brought into contact with the work material 201, and the work material 201 is cut. Then, as illustrated in FIG. 14, the cutting tool 101 is relatively moved away from the work material 201 by moving the cutting tool 101 in a D3 direction.

In the present embodiment, the cutting tool 101 is brought close to the work material 201 in a state where the axis D is fixed and the work material 201 is rotating. Furthermore, in FIG. 13, the work material 201 is cut by bringing the front cutting edge 21, the corner cutting edges, and the lateral cutting edges of the cutting insert 1 into contact with the work material 201 that is rotating. Furthermore, in FIG. 14, the cutting tool 101 is moved away from the work material 201 in a state where the work material 201 is rotating.

Here, in the machining of the manufacturing method of the present embodiment, in each of these steps, the cutting tool 101 is brought into contact with or separated from the work material 201 by moving the cutting tool 101. However, the present embodiment is of course not limited thereto.

For example, in step (1), the work material 201 may be brought close to the cutting tool 101. In the same manner, in step (3), the work material 201 may be moved away from the cutting tool 101. In a case where the machining is to be continued, steps of bringing the cutting edges of the cutting insert 1 into contact with different positions on the work material 201 may be repeated by maintaining the rotating state of the cutting tool 101.

Here, representative examples of the material of the work material 201 include carbon steel, alloy steel, stainless steel, cast iron, non-ferrous metals, or the like.

REFERENCE SIGNS LIST

1 Cutting insert (insert)
3 Main body section
5 Cutting section
7 Top side surface
7a Top side groove portion
9 Bottom side surface
11 Top surface
13 Bottom surface
15 First side surface 17 Second side surface
19 Third side surface
21 Front cutting edge
23 Lateral cutting edge
25 Corner cutting edge
27 First region
29 Second region
31 Connecting region
33 Rake face
35 Third region
37 Fourth region
101 Cutting tool
103 Insert pocket (pocket)
105 Holder
107 Upper jaw portion
109 Lower jaw portion
111 Fixing screw
201 Work material

The invention claimed is:

1. A cutting insert comprising:
   a main body section elongated in a direction from a rear side to a front side; and
   a cutting section located in front of the main body section and comprising
   a top surface;
   a bottom surface;
   a first side surface located at the front side and between the top surface and the bottom surface;
   a second side surface located between the top surface and the bottom surface and adjacent to the first side surface;
   a front cutting edge disposed along a ridge line of the cutting section at an intersection between the top surface and the first side surface;
   a lateral cutting edge disposed along the ridge line at an intersection between the top surface and the second side surface, the lateral cutting edge having an ascending incline from the front cutting edge toward the main body section; and
   a corner cutting edge disposed between the front cutting edge and the lateral cutting edge,
   wherein
   the lateral cutting edge comprises a first region near to the front cutting edge and extending in an ascending incline from the corner cutting edge toward the main body and a second region located to a rear of the first region;
   the first region and the second region each having a linear shape in side view, and an angle of inclination of the second region with respect to the bottom surface being larger than an angle of inclination of the first region with respect to the bottom surface.

2. The cutting insert according to claim 1, wherein the first region and the second region are smoothly connected by a connecting region having a curved shape, the connecting region inclined from the first region to the second region.

3. The cutting insert according to claim 1, wherein:
   the lateral cutting edge comprises a third region having a linear shape and located to a rear of the second region;
   an angle of inclination of the third region with respect to the bottom surface being larger than the angle of inclination of the second region with respect to the bottom surface.

4. A cutting tool comprising:
   a holder comprising an insert pocket on a side of a front end thereof; and
   the cutting insert according to claim 1, configured to be mounted to the insert pocket with the front cutting edge protruding from the front end of the holder.

5. A method for manufacturing a machined product, the method comprising:
   rotating a work material;
   bringing the front cutting edge of the cutting tool according to claim 4 into contact with the work material that is rotating; and
   separating the cutting tool from the work material.

* * * * *